(12) United States Patent
Urashima

(10) Patent No.: US 12,028,593 B2
(45) Date of Patent: Jul. 2, 2024

(54) MONITORING CAMERA

(71) Applicant: PANASONIC I-PRO SENSING SOLUTIONS CO., LTD., Fukuoka (JP)

(72) Inventor: Yoshihito Urashima, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 15 days.

(21) Appl. No.: 17/692,890

(22) Filed: Mar. 11, 2022

(65) Prior Publication Data
US 2022/0303444 A1    Sep. 22, 2022

(30) Foreign Application Priority Data
Mar. 17, 2021 (JP) .................. 2021-043682

(51) Int. Cl.
*H04N 23/52* (2023.01)
*H04N 23/51* (2023.01)

(52) U.S. Cl.
CPC ............ *H04N 23/52* (2023.01); *H04N 23/51* (2023.01)

(58) Field of Classification Search
CPC ............................... H04N 23/52; H04N 23/51
USPC ....................................................... 348/143
See application file for complete search history.

(56) References Cited

U.S. PATENT DOCUMENTS

| | | | | |
|---|---|---|---|---|
| 5,864,365 | A | * | 1/1999 | Sramek ............ G08B 13/19619 348/E5.026 |
| 6,061,087 | A | * | 5/2000 | Schieltz ........... G08B 13/19619 348/151 |
| 2003/0053806 | A1 | * | 3/2003 | Schneider .......... G08B 13/1963 396/427 |
| 2005/0267329 | A1 | * | 12/2005 | Konstorum ........ A61B 1/00105 600/167 |
| 2005/0276599 | A1 | * | 12/2005 | Kajino .................... H04N 23/51 396/419 |
| 2018/0128445 | A1 | * | 5/2018 | Lee ........................ F21S 45/50 |
| 2019/0227304 | A1 | * | 7/2019 | Eftekhari ............... G03B 17/04 |
| 2019/0310470 | A1 | * | 10/2019 | Weindorf .................. B60S 1/56 |
| 2019/0313001 | A1 | * | 10/2019 | Kawashima ........... G03B 17/55 |
| 2020/0159090 | A1 | * | 5/2020 | Liu ......................... H04N 23/52 |
| 2020/0292919 | A1 | * | 9/2020 | Goodman .............. H04N 23/54 |
| 2021/0106947 | A1 | * | 4/2021 | Jouni ..................... B01D 53/30 |
| 2022/0105781 | A1 | * | 4/2022 | Salter ...................... B60S 1/026 |

FOREIGN PATENT DOCUMENTS

JP         2019-186915 A      10/2019

* cited by examiner

*Primary Examiner* — Matthew David Kim
(74) *Attorney, Agent, or Firm* — GREENBLUM & BERNSTEIN, P.L.C.

(57) ABSTRACT

A monitoring camera includes a lens portion, a bottomed cylindrical-shaped housing in which an opening portion so as to dispose the lens portion is sealed by a dome cover, a heating element provided in the housing, a high temperature portion in which the heating element is disposed in the housing, a low temperature portion that is separated from the heating element and that has a temperature lower than that of the high temperature portion in the housing, and a humidity adjustment member disposed in the low temperature portion.

8 Claims, 12 Drawing Sheets

MONITORING CAMERA

CROSS-REFERENCE TO RELATED APPLICATIONS

This application is based on and claims priority under 35 USC 119 from Japanese Patent Application No. 2021-043682 filed on Mar. 17, 2021, the contents of which are incorporated herein by reference.

TECHNICAL FIELD

The present disclosure relates to a monitoring camera.

BACKGROUND ART

In a monitoring camera, when dew condensation occurs on a light-transmissive cover provided to protect a lens, sharpness (that is, visibility) of a captured image may be decreased. Therefore, for example, a monitoring camera of Patent Literature 1 includes a heater, a fan, and a waterproof air-permeable membrane, and air in a housing heated by the heater is gradually exhausted to an outside together with water vapor through the waterproof air-permeable membrane to dehumidify an inside of the housing. Further, in addition to Patent Literature 1, a technique of dehumidifying the inside of the housing by mounting a dehumidifying element in the housing of the camera is also proposed. Further, a technique is also known in which the heater is mounted in the housing of the camera to prevent local dew condensation of a dome cover or the like. Furthermore, a technique of dehumidifying the inside of the housing of the camera by mounting a drying agent in the housing of the camera is also proposed.

CITATION LIST

Patent Literature

Patent Literature 1: JP-2019-186915-A

According to Patent Literature 1, the monitoring camera can exhaust the heated air together with the water vapor to the outside through the waterproof air-permeable membrane. However, for example, when the housing of the camera is desired to have a sealed structure for the purpose of improving waterproofness or the like, there is a demand for adjusting humidity only in the housing without using the waterproof air-permeable membrane. In contrast, in the configuration in which the dehumidifying element is mounted in the housing of the camera, the dehumidifying element is expensive, and a product cost is increased. Further, in the configuration in which the heater is mounted in the housing of the camera, dew condensation on a locally heated portion can be avoided, but a sufficient effect of preventing the dew condensation cannot be expected in other portions (for example, a periphery of the lens portion), and therefore image quality of the captured image may deteriorate. Furthermore, in the configuration in which the drying agent is mounted in the housing of the camera, when the drying agent absorbs moisture, a dew condensation prevention effect is lost, and it is difficult to obtain a sharp captured image over a long period of time.

SUMMARY OF INVENTION

The present disclosure has been made in view of the above-described related-art circumstances, and an object thereof is to provide a monitoring camera that can prevent dew condensation inside housing in a housing having a sealed structure and that can reduce deterioration in image quality of a captured image.

The present disclosure provides a monitoring camera including a lens portion, a bottomed cylindrical-shaped housing in which an opening portion so as to dispose the lens portion is sealed by a dome cover, a heating element provided in the housing, a high temperature portion in which the heating element is disposed in the housing, a low temperature portion that is separated from the heating element and that has a temperature lower than that of the high temperature portion in the housing, and a humidity adjustment member disposed in the low temperature portion.

Further, the present disclosure provides a monitoring camera including a lens portion, a box-shaped housing in which an opening portion so as to dispose the lens portion is sealed by a flat front surface cover, a heating element provided in the housing, a high temperature portion in which the heating element is disposed in the housing, a low temperature portion that is separated from the heating element and that has a temperature lower than that of the high temperature portion in the housing, and a humidity adjustment member disposed in the low temperature portion.

According to the present disclosure, in a monitoring camera including a housing having a sealed structure, it is possible to prevent dew condensation inside the housing and to reduce deterioration in image quality of a captured image.

DESCRIPTION OF EMBODIMENTS

Hereinafter, embodiments in which a monitoring camera according to the present disclosure is specifically disclosed will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

First Embodiment

First, a monitoring camera 11 according to a first embodiment will be described with reference to FIGS. 1 to 7.

Figure 1:
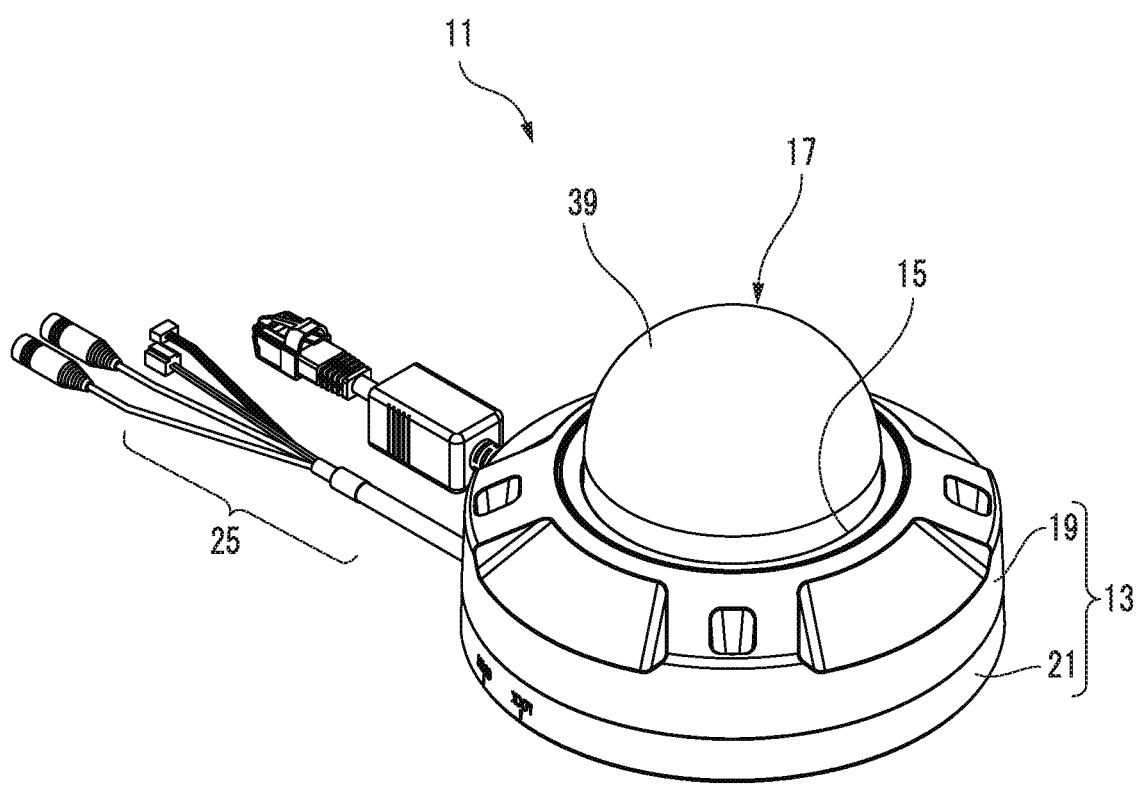
FIG. 1 is a perspective view showing an example of a monitoring camera according to a first embodiment.

FIG. 1 is a perspective view showing an example of the monitoring camera 11 according to the first embodiment. The monitoring camera 11 according to the first embodiment includes a so-called dome-shaped housing 13. An installation environment of the monitoring camera 11 is, for example, outdoors. The monitoring camera 11 may be installed indoors such as in a factory or a warehouse.

The housing 13 includes a concentric opening portion 15 at a central portion thereof. A dome cover 17 is disposed on the opening portion 15. The housing 13 is airtightly assembled by fixing a dome case 19 including the opening portion 15 to a chassis 21 having the same outer diameter by a plurality of fixing screws 23 (see FIG. 3). That is, the housing 13 has a bottomed cylindrical shape in which the opening portion 15 is sealed by the dome cover 17. The dome case 19 and the chassis 21, which are constituent members of the housing 13, are molded using a metal such as an aluminum alloy. A power supply line or various cables 25 for communication are drawn out from the chassis 21 of the housing 13.

Figure 2:
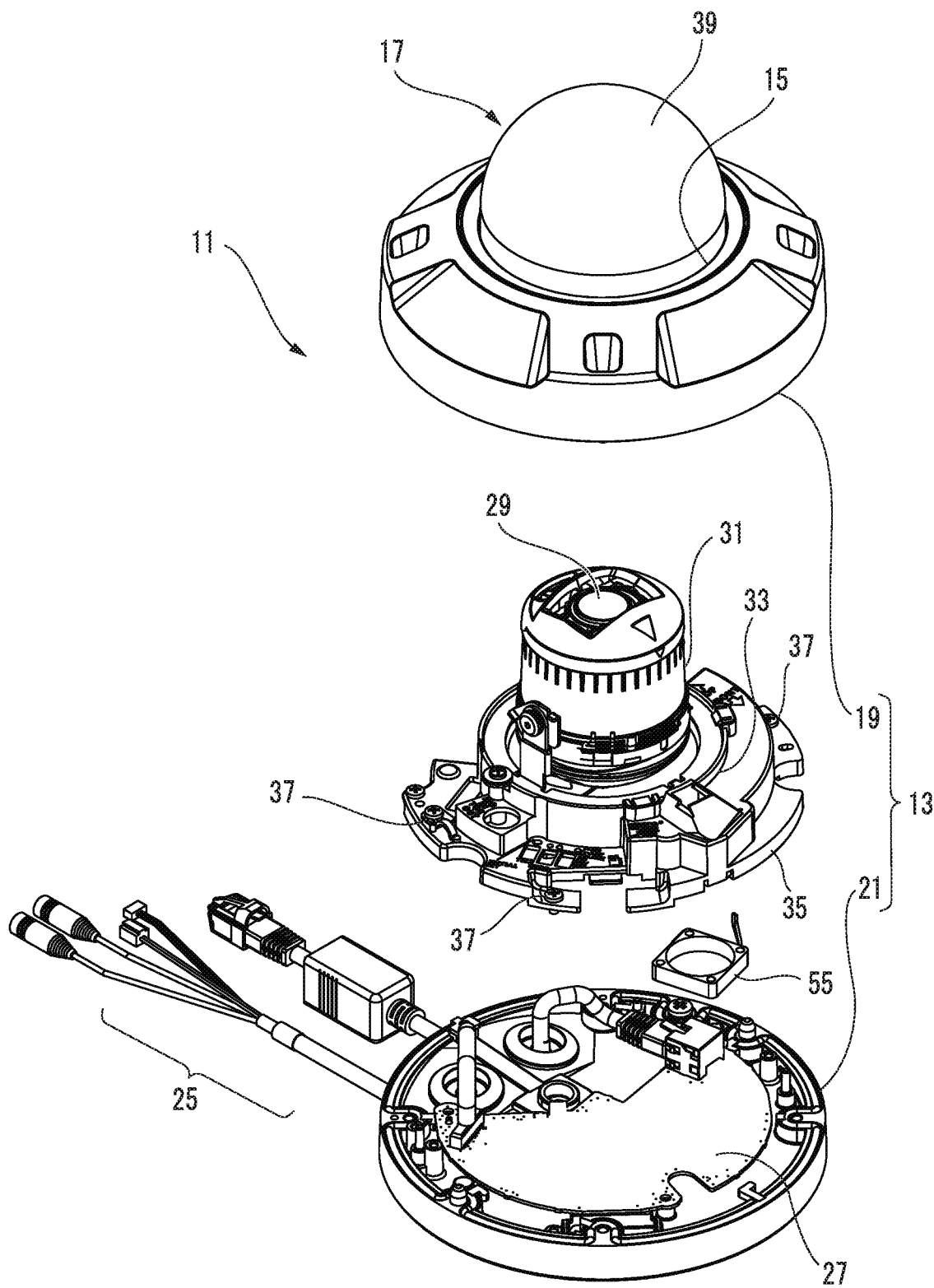
FIG. 2 is an exploded perspective view of the monitoring camera shown in FIG. 1.

FIG. 2 is an exploded perspective view of the monitoring camera 11 shown in FIG. 1. A substrate 27 as an example of a heating element is fixed to the chassis 21. A processor such as a central processing unit (CPU) is mounted (installed) as a control unit on the substrate 27, and the processor always generates heat because of executing various processings during operation of the monitoring camera 11. Therefore, the substrate 27 on which the processor that generates heat is mounted is an example of the heating element of the monitoring camera 11. The electronic component that generates heat may not be limited to the processor.

A camera main body portion 31 including a lens portion 29 is disposed above the substrate 27. In the camera main body portion 31, an inner cover 33 is fixed to a side opposite to the lens portion 29. The inner cover 33 is supported by a pedestal portion 35. The pedestal portion 35 is fixed to the chassis 21 by the plurality of fixing screws 37. That is, in the camera main body portion 31, the inner cover 33 is fixed to the chassis 21 via the pedestal portion 35 so as to be separated upward from the substrate 27.

Figure 3:
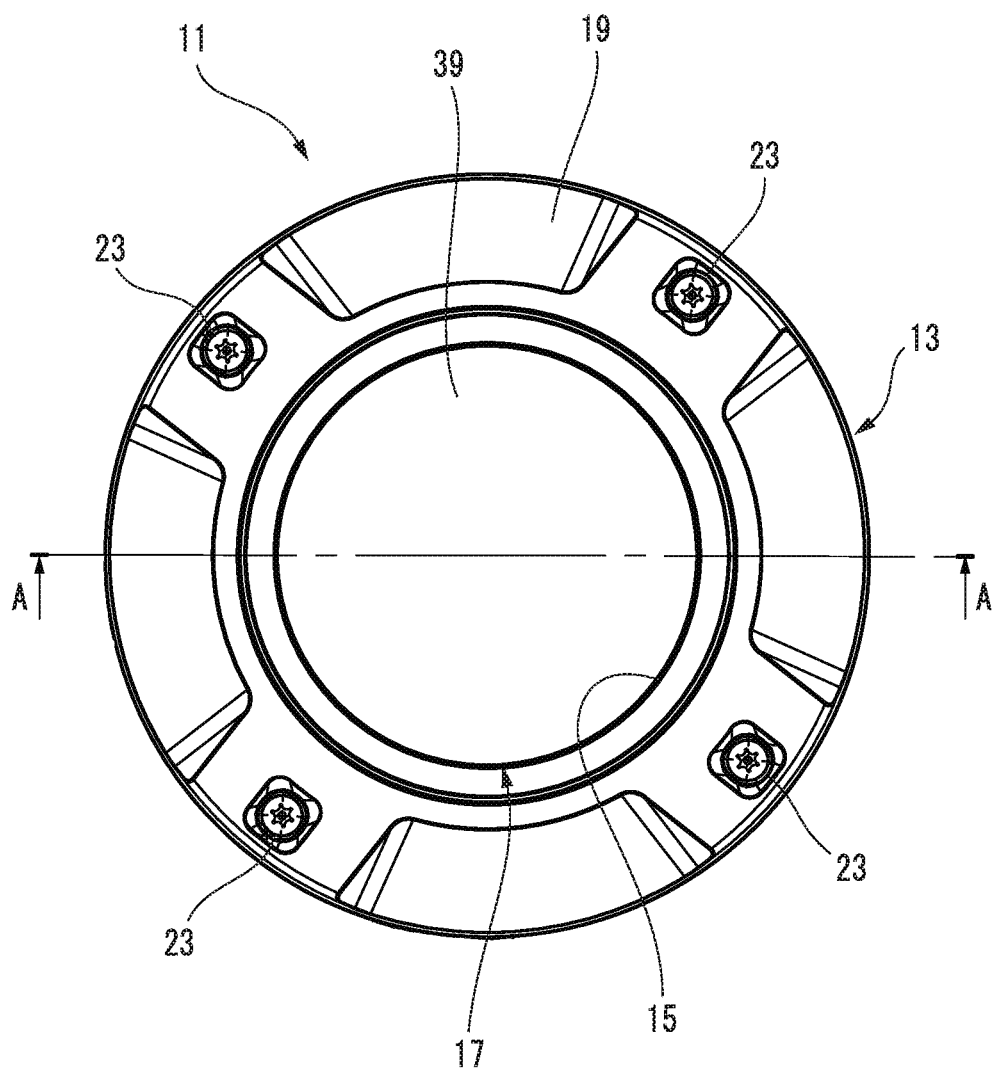
FIG. 3 is a plan view of the monitoring camera shown in FIG. 1.

FIG. 3 is a plan view of the monitoring camera 11 shown in FIG. 1. In the monitoring camera 11, the dome case 19, the opening portion 15, and the dome cover 17 are concentrically arranged. The dome case 19 is fixed to the chassis 21 by, for example, the four fixing screws 23 at equal intervals in a circumferential direction.

Figure 4:
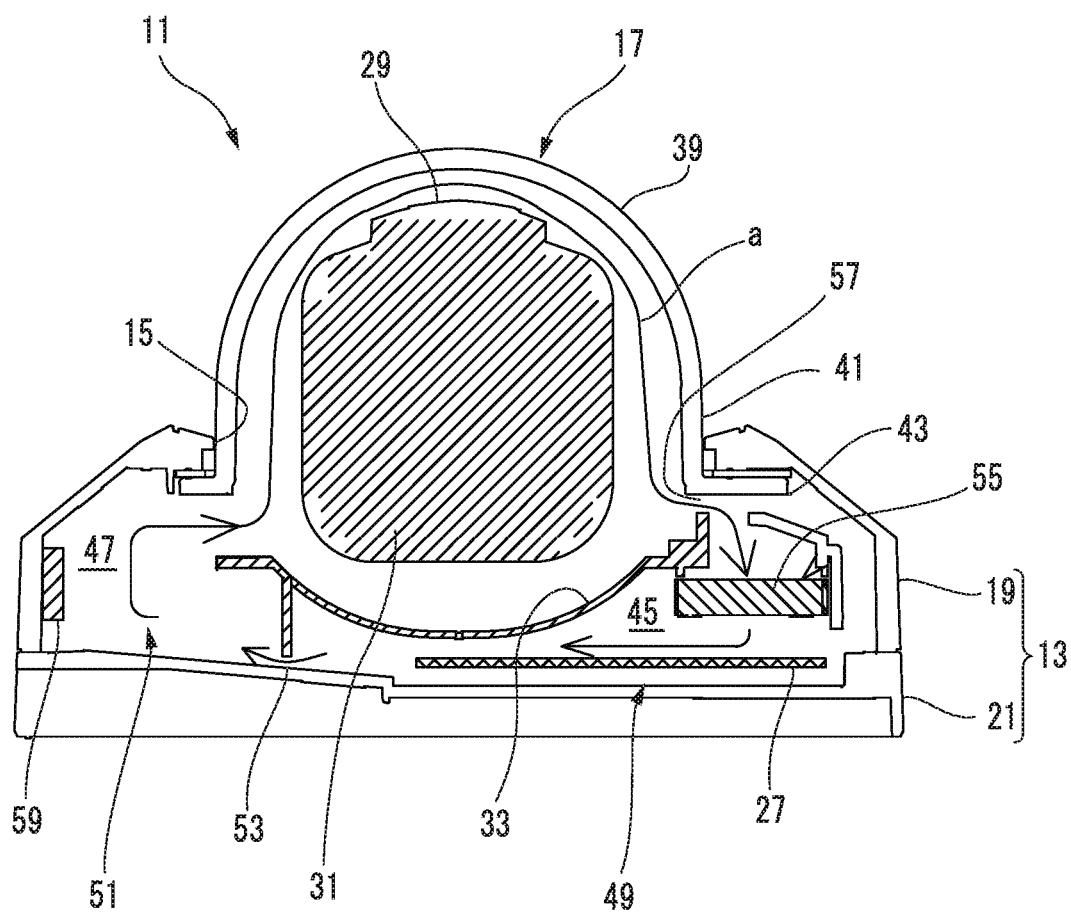
FIG. 4 is a cross-sectional view taken along a line A-A in FIG. 3.

FIG. 4 is a cross-sectional view taken along a line A-A in FIG. 3. The dome cover 17 includes a hemispherical dome portion 39 and a straight portion 41 that extends in a tubular shape from an open side of the dome portion 39. A flange portion 43 that protrudes outward in a radial direction is formed on an opening side of the straight portion 41. The flange portion 43 is airtightly fixed to the opening portion 15 of the dome case 19 by interposing an annular packing (not shown). The dome cover 17 is molded using, for example, polycarbonate (PC).

The lens portion 29 of the camera main body portion 31 is disposed inside the dome cover 17 with a gap. The camera main body portion 31 includes an image sensor (not shown) that forms an image of image-capturing light which is from a subject and which has passed through the lens portion 29 on a light-receiving surface. Here, the image sensor is configured using, for example, a charge coupled device (CCD) or a complementary metal oxide semiconductor (CMOS). The image sensor sends an electric signal (analog signal) corresponding to light received by the light-receiving surface (in other words, image-capturing surface) to the processor at predetermined time intervals (for example, $\frac{1}{60}$ (seconds)). That is, a frame rate of the monitoring camera 11 is, for example, 60 fps (frame per second). The value is an example, and the frame rate is not limited to 60 fps. The analog signal is converted into data of a captured image in a digital format by the processor. Accordingly, the data of the captured image is generated by the processor. In this way, the monitoring camera 11 can acquire the captured image data in the digital format at predetermined time intervals (for example, $\frac{1}{60}$ (seconds)). Since a function of the image sensor is similar to that in the following second embodiment, description of similar content will be omitted.

In the housing, there are a high temperature portion 45 in which the substrate 27 serving as the heating element is disposed, and a low temperature portion 47 that is separated from the substrate 27 and that has a temperature lower than that of the high temperature portion 45. In the first embodiment, the high temperature portion 45 and the low temperature portion 47 are partitioned by the inner cover 33 without airtightness. That is, the inner cover 33 is provided between the high temperature portion 45 and the low temperature portion 47, and partitions an inside of the housing into a high temperature chamber 49 and a low temperature chamber 51 having a temperature lower than that of the high temperature chamber 49. In the low temperature chamber 51, for example, the inner cover 33 and the chassis 21 are abutted against each other or placed therein, so that a slight gap 53 is formed at a boundary between the low temperature chamber 51 and the high temperature chamber 49. In the present description, "partitioned without airtightness" means that the slight gap 53 is present.

A fan 55 as an example of an air blower is installed in the high temperature chamber 49. As the fan 55, for example, an axial flow fan driven by a motor is used. A gap 57 that communicates between the lens portion 29 and the dome cover 17 is formed in the high temperature chamber 49. The fan 55 sucks air between the lens portion 29 and the dome cover 17 from the gap 57, and supplies the air so as to blow the air to the substrate 27. The air blown to the substrate 27 to cool the substrate 27 is recirculated to a space between the lens portion 29 and the dome cover 17 again, and a part of the air also slightly flows into the low temperature chamber 51 and then is recirculated to the space between the lens portion 29 and the dome cover 17 again. That is, air circulation indicated by an arrow a in FIG. 4 occurs in the housing. The position of the low temperature portion 47 shown in FIG. 4 is an example, and the low temperature portion 47 may be provided, for example, between the lens portion 29 and the dome cover 17, on a suction side of the fan 55, or the like as long as the temperature of the low temperature portion 47 is lower than that of the high temperature portion 45.

The monitoring camera 11 includes a humidity adjustment member 59 in the low temperature chamber 51. In the first embodiment, the humidity adjustment member 59 is bonded to an inner peripheral surface of the dome cover 17 as, for example, a quadrangular rubber-shaped sheet piece.

Figure 5:
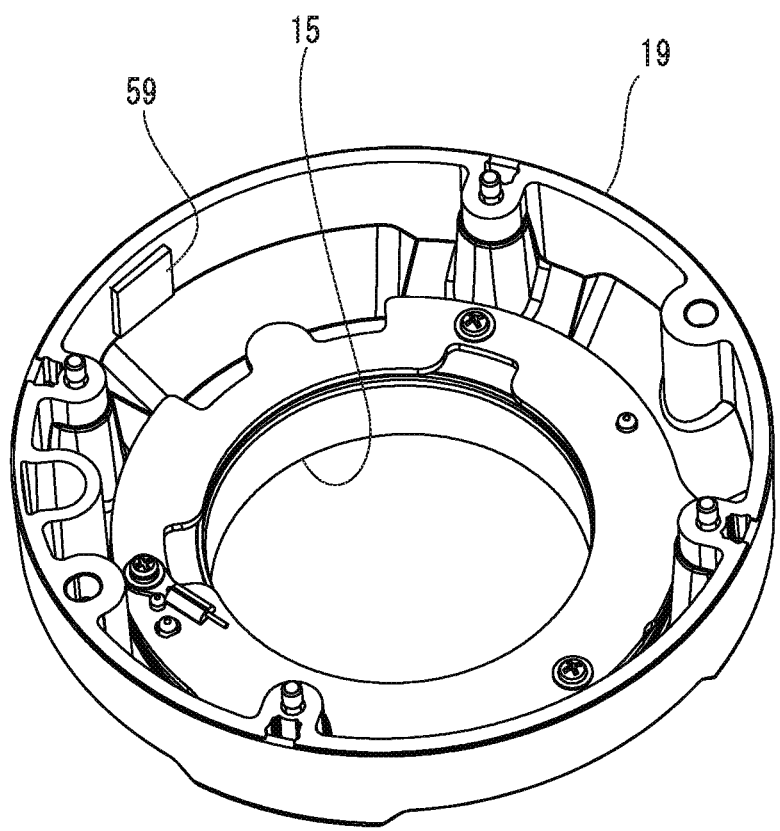
FIG. 5 is a rear view of a dome case.

FIG. 5 is a rear view of the dome case 19. The humidity adjustment member 59 can adjust humidity in a space to a predetermined range over a long period of time. The humidity adjustment member 59 absorbs moisture when the humidity is high, and releases the moisture when the humidity is low. The effect continues semi-permanently. As the humidity adjustment member 59, for example, a rubber molded body for humidity adjustment and a humidity adjustment member disclosed in JP-A-2004-315557 can be used.

Figure 6:
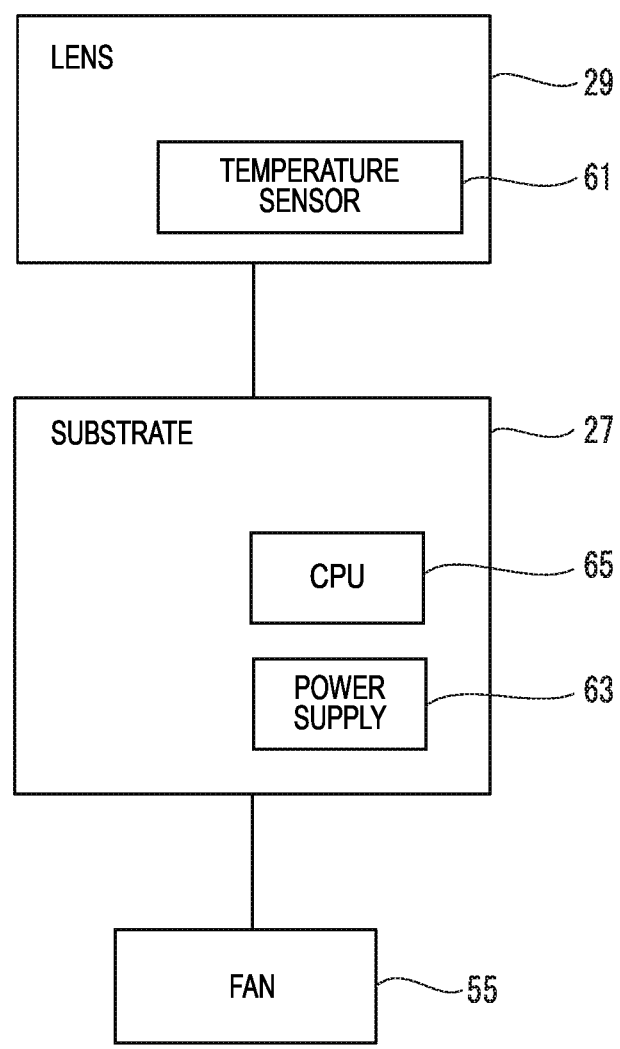
FIG. 6 is a block diagram showing a schematic hardware configuration example of the monitoring camera.

FIG. 6 is a block diagram showing a schematic hardware configuration example of the monitoring camera 11. The monitoring camera 11 includes the lens portion 29, the substrate 27, and the fan 55. The lens portion 29 is provided with a temperature sensor 61. The temperature sensor 61 detects a temperature around the lens portion 29 (that is, a temperature around the lens portion 29 in the housing of the monitoring camera 11). Data of the detected temperature is input to the processor. In the monitoring camera 11, when dew condensation occurs around the lens portion 29, image quality of the captured image deteriorates. Therefore, the temperature sensor 61 that can detect the temperature around the lens portion 29 is disposed in the lens portion 29. Since a function of the temperature sensor 61 is similar to that in the following second embodiment, description of similar content will be omitted. The substrate 27 is provided with a processor (for example, a CPU 65) to which power is supplied from a power supply unit 63. The CPU 65 performs control to drive the fan 55 when a temperature detected by the temperature sensor 61 decreases to a specified temperature within a predetermined certain period of time.

Figure 7:
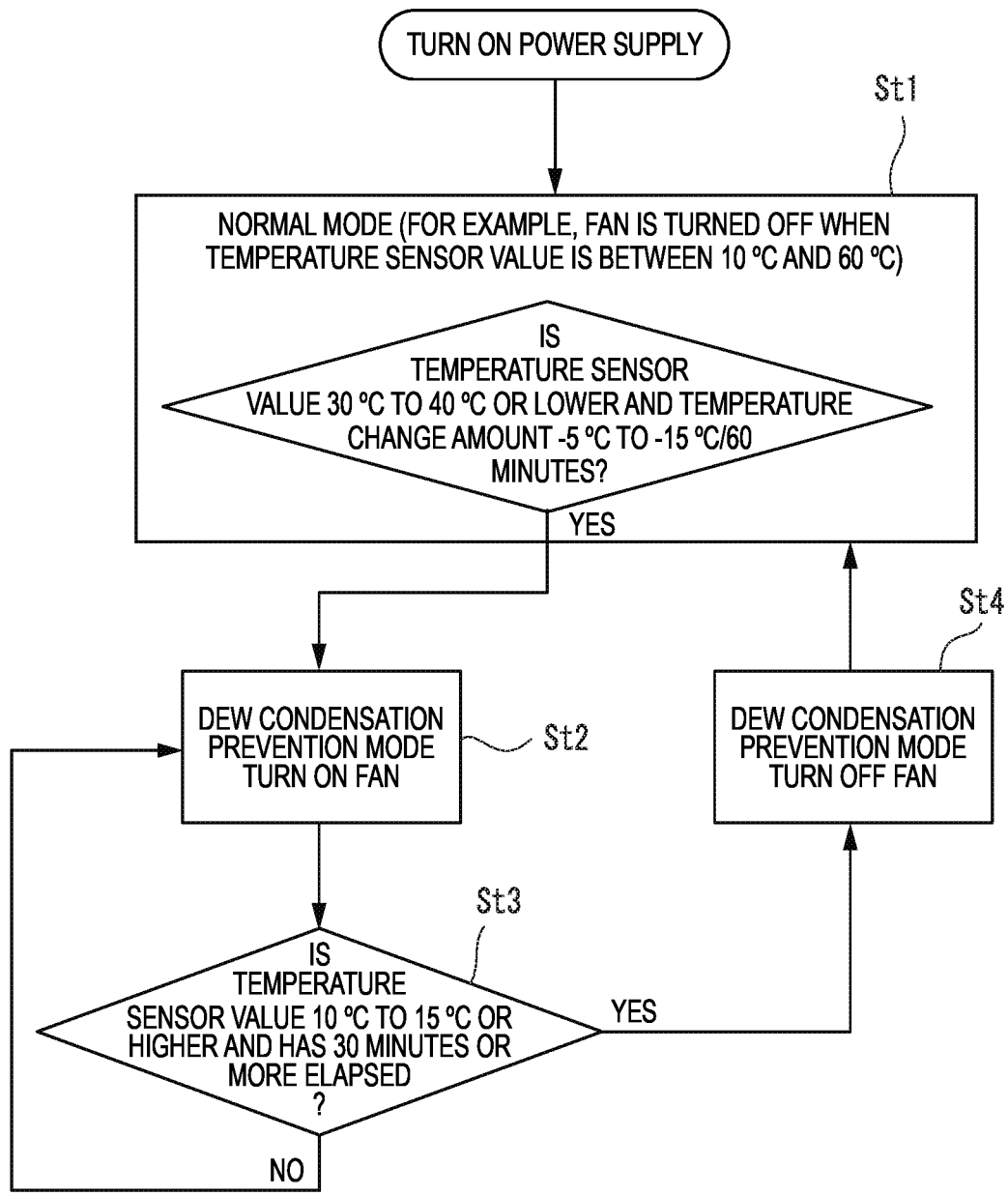
FIG. 7 is a flowchart showing a control procedure of a fan.

FIG. 7 is a flowchart showing a control procedure of the fan 55. More specifically, when the monitoring camera 11 is powered on and a detection value of the temperature sensor 61 is, for example, between 10° C. and 60° C., the monitoring camera 11 determines that the monitoring camera 11 is in a normal mode and the CPU 65 turns off the fan 55. At the same time, the CPU 65 determines whether the detection value of the temperature sensor 61 is 30° C. to 40° C. or lower and a temperature change amount per hour is −5° C. to −15° C. (St1). When a condition of the detection value of the temperature sensor 61 and the temperature change amount per hour is satisfied, the CPU 65 enters a dew condensation prevention mode and determines to turn on the fan 55 (St2).

After turning on the fan 55, the CPU 65 subsequently determines whether the detection value of the temperature sensor 61 is 10° C. to 15° C. or higher and elapsed time since a start time point of the dew condensation prevention mode is 30 minutes or more (St3). When a condition of the detection value of the temperature sensor 61 and the elapsed time since the start time point of the dew condensation prevention mode is satisfied, the CPU 65 determines to turn off the fan 55 (St4), and performs control to return to the normal mode.

Next, an operation of the monitoring camera 11 according to the above-described first embodiment will be described.

The monitoring camera 11 according to the first embodiment includes the lens portion 29, the bottomed cylindrical-shaped housing 13 in which the opening portion 15 in which the lens portion 29 is disposed is sealed by the dome cover 17, the heating element provided in the housing, the high temperature portion 45 in which the heating element is disposed in the housing, the low temperature portion 47 that is separated from the heating element in the housing and that has a temperature lower than that of the high temperature portion 45, and the humidity adjustment member 59 disposed in the low temperature portion 47.

In the monitoring camera 11, the opening portion 15 of the housing 13 in which the lens portion 29 is disposed is sealed by the dome cover 17. The substrate 27, which is the heating element, is provided in the sealed housing. The high temperature portion 45 in which the substrate 27 is disposed and the low temperature portion 47 having a temperature lower than that of the high temperature portion 45 are present in the housing. In the monitoring camera 11, the humidity adjustment member 59 is disposed in the low temperature chamber 51.

The humidity adjustment member 59 can adjust the humidity in the space to the predetermined range over a long period of time. The humidity adjustment member 59 has a humidity adjustment (humidity-adjusting) function of absorbing the moisture when the humidity is high and releasing the moisture when the humidity is low, and the effect thereof is semi-permanently continued, unlike a case where a drying ability is lost after a drying agent absorbs moisture.

The high temperature portion 45 of the housing 13 is likely to have an air temperature higher than an outside air temperature due to heat generated from the substrate 27. The humidity adjustment member 59 is disposed in the low temperature portion 47 of the housing 13, and continues to adjust relative humidity of the low temperature portion 47 to, for example, 50% to 60%.

Since a temperature of a front surface (for example, an inner surface of the dome cover) of the lens portion 29 of the monitoring camera 11 is close to the outside air temperature, humidity-adjusted air is cooled to about the outside air temperature on the inner surface of the dome cover.

At this time, when a water vapor amount of the humidity-adjusted air is equal to or smaller than a saturated water vapor amount of the outside air temperature, water vapor remains in the air as the water vapor and does not cause dew condensation, but when the water vapor amount of the humidity-adjusted air is equal to or larger than the saturated water vapor amount of the outside air temperature, water vapor that is not saturated may be generated as dew condensation.

Here, as an example of a use case of the monitoring camera 11, the monitoring camera 11 installed at the time of damp and hot in summer is considered.

For example, it is assumed that the monitoring camera 11 is installed in an environment in which an outside air temperature is 35° C. and humidity is 70%. When installing the camera, in order to adjust an angle of view of the lens portion 29, since the dome cover is once removed and the work is performed, water vapor of air at that time enters the housing of the monitoring camera 11. A water vapor amount at the outside air temperature of 35° C. and the humidity of 70% corresponds to 27.7 g/m$^3$.

When the work is completed and the dome cover 17 is closed, the humidity adjustment member 59 adjusts humidity in the housing to, for example, about relative humidity of 50% to 60%.

At this time, the water vapor amount is about 20 g/m$^3$, and water vapor of 7 g/m$^3$ to 8 g/m$^3$ is taken into the humidity adjustment member 59. More precisely, the humidity adjustment member 59 absorbs "moisture" corresponding to the water vapor of 7 g/m$^3$ to 8 g/m$^3$.

Eventually, the outside air temperature decreases toward winter, and the relative humidity in the housing is maintained at, for example, 50% to 60% while the water vapor is repeatedly absorbed or released by the humidity adjustment member 59 in accordance with a temperature at that time.

For example, when an amount of increase in a temperature in the housing of the monitoring camera 11 is 20° C., the temperature in the housing is 25° C. in an environment of an outside air temperature of 5° C. in the winter. At this time, the humidity adjustment member 59 adjusts the humidity to a temperature in the housing of 25° C. and relative humidity of 50% to 60%. The water vapor amount at this time is about 12 g/m$^3$.

However, since the temperature of the front surface of the lens (for example, the inner surface of the dome cover) of the monitoring camera 11 is close to the outside air temperature, for example, when the temperature is 5° C. that is the same as the outside air temperature, the saturated water vapor amount is 6.8 g/m$^3$, and therefore the water vapor of about 5 g/m$^3$ that cannot be dissolved may be condensed as water.

Therefore, regarding the effect of the humidity adjustment member 59, the smaller the amount of increase in the internal temperature of the monitoring camera 11 is, the more likely there is no temperature difference from the outside air temperature, and the higher the dew condensation prevention effect is, but the larger the amount of increase in the temperature in the housing of the monitoring camera 11 is, the larger the temperature difference from the outside air temperature is, and the lower the dew condensation prevention effect is.

Therefore, the dew condensation prevention effect is higher when the humidity adjustment member 59 is not disposed at a high temperature part (for example, the high temperature portion 45) but is disposed at a low temperature part (for example, the low temperature portion 47) even in the housing.

In the related art, in a sealed housing, absolute humidity is constant even when a temperature in the housing varies. That is, in the example described above, since the housing 13 is sealed at the temperature of 35° C. and the relative humidity of 70%, the water vapor amount in the housing remains at an initial sealing value of 27.7 g/m$^3$.

In a monitoring camera of the related art, relative humidity in the housing varies due to an influence of the outside air temperature. On the contrary, in the monitoring camera 11 in which the humidity adjustment member 59 is provided in the sealed housing, since the relative humidity is adjusted to 50% to 60% regardless of the change in the temperature in the housing, the absolute humidity varies.

In contrast, in the monitoring camera 11 according to the first embodiment, since the substrate 27 is disposed as an example of the heating element and the metal housing is cooled by outside air, when the low temperature portion 47 and the high temperature portion 45 are present in the housing, the relative humidity is higher in the low temperature portion 47. The low temperature portion 47 may be, for example, a portion that is separated from the substrate 27 and in contact with the inner wall surface of the metal housing over a large area. Since the humidity adjustment member 59 can adjust the relative humidity to 50% to 60%, more water vapor can be absorbed by disposing the humidity adjustment member 59 in the low temperature portion 47 in which the relative humidity is high.

For example, it is assumed that a relative humidity of 90% is adjusted to the relative humidity of 50% to 60% by the humidity adjustment member 59 at a temperature of 11° C. of the low temperature portion 47. In this case, the water vapor amount at the temperature of 11° C. and the relative humidity of 50% to 60% is about 5 g/m$^3$. Since the humidity adjustment member 59 is disposed in the low temperature portion 47, for example, when air in the housing is replaced with air in the low temperature portion 47 in which air in each portion is humidity-adjusted by natural convection, the absolute humidity of the entire housing approaches a water vapor amount of about 5 g/m$^3$. When the water vapor amount is smaller than a saturated water vapor amount of 6.8 g/m$^3$ at 5° C., even when a temperature of an inner surface of the dome cover 17 decreases to 5° C., the dew condensation can be prevented from occurring.

Figure 8:
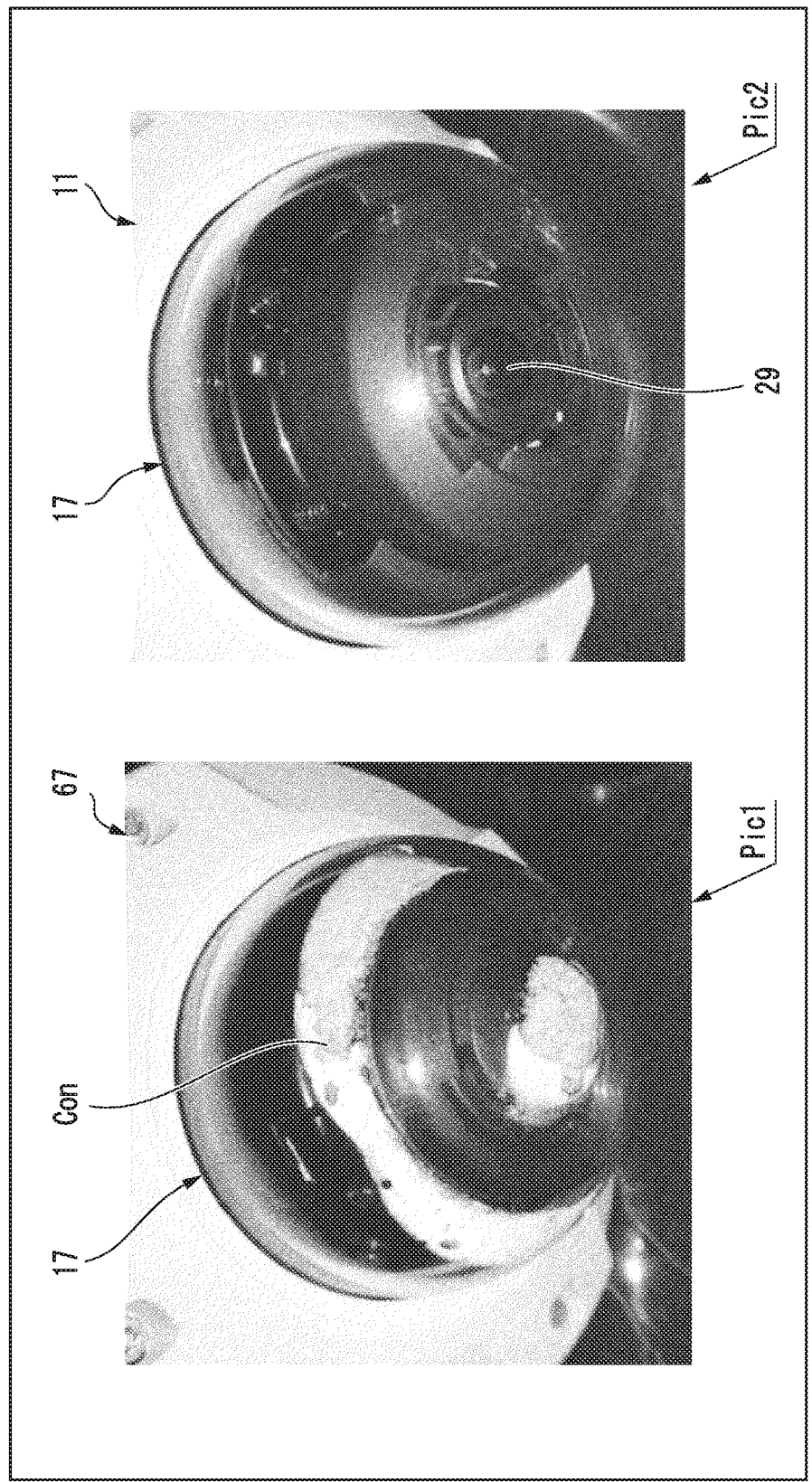
FIG. 8 is a perspective view of a captured external appearance of a monitoring camera according to a comparative example and a captured external appearance of the monitoring camera according to the first embodiment during operation in winter.

FIG. 8 is a perspective view of a captured external appearance of a monitoring camera 67 according to a comparative example and a captured external appearance of the monitoring camera 11 according to the first embodiment during operation in winter. In the monitoring camera 67 according to the comparative example in which the humidity adjustment member 59 is not provided in the low temperature portion 47, when a temperature of the inner surface of the dome cover 17 decreases to 5° C., as shown in Pic1 of FIG. 8, dew condensation Con occurs on the inner surface of the dome cover, whereas in the monitoring camera 11 according to the first embodiment in which the humidity adjustment member 59 is disposed in the low temperature portion 47, as shown in Pic2 of FIG. 8, the dew condensation does not occur on the inner surface of the dome cover.

The monitoring camera 11 includes the inner cover 33 that is provided between the high temperature portion 45 and the low temperature portion 47 and that partitions the inside of the housing into the high temperature chamber 49 and the low temperature chamber 51 having a temperature lower than that of the high temperature chamber 49 without the airtightness.

In the monitoring camera 11, the high temperature portion 45 and the low temperature portion 47 in the housing are partitioned by the inner cover 33. Here, the expression "partitions without airtightness" means a partition structure in which a slight amount of air can be circulated via the gap 53 slightly generated by an assembly structure such as abutting connection between members. Therefore, a large amount of air having a high temperature due to exhaust heat does not directly flow into the low temperature portion 47 from the high temperature portion 45 in which the substrate 27 is disposed. The low temperature portion 47 can prevent inflow of heat from the substrate 27, and can reliably maintain a lower temperature than the high temperature portion 45 as compared with a structure in which the inner cover 33 is not provided. Accordingly, the low temperature portion 47 for improving moisture-absorbing performance of the humidity adjustment member 59 can be more reliably secured in the narrow housing.

In the monitoring camera 11, the fan 55 that conveys air between the lens portion 29 and the dome cover 17 to the heating element is provided in the housing.

In the monitoring camera 11, the fan 55 is provided in the housing. The fan 55 conveys the air between the lens portion 29 and the dome cover 17 to the substrate 27. The air conveyed to the substrate 27 absorbs heat from the substrate 27 and increases a temperature thereof, and most of the air is recirculated to the space between the lens portion 29 and the dome cover 17 again. At this time, the heated air also flows into the low temperature portion 47 from the gap between the members, but since an inflow amount is restricted to be small, the low temperature portion 47 is prevented from being heated to a high temperature due to exhaust heat of the substrate 27. Particularly, in winter in a cold region, an amount of heat absorbed from the inner wall surface of the metal housing, which has become low in temperature due to the outside air temperature, is larger than an amount of heat due to an inflow of the exhaust heat.

In the monitoring camera 11, since air can be circulated by forced convection among the substrate 27, the lens portion 29, and the dome cover 17, air in the low temperature portion 47 humidity-adjusted by the humidity adjustment member 59 and air in other portions can be replaced with each other more quickly than in a case of natural convection. Accordingly, a humidity-adjusting effect of the humidity adjustment member 59 can be exhibited more quickly and effectively.

The monitoring camera 11 includes the temperature sensor 61 provided in the lens portion 29, and the control unit that drives and controls the fan 55 when a temperature detected by the temperature sensor 61 decreases by a specified temperature within a certain period of time.

In the monitoring camera 11, the fan 55 is driven when a temperature of the lens portion 29 decreases and the dew condensation is likely to occur on the inner surface of the dome cover. When the fan 55 is driven, as described above, since the air can be circulated among the substrate 27, the lens portion 29, and the dome cover 17, the air in the low temperature portion 47 humidity-adjusted by the humidity adjustment member 59 and the air in other portions can be replaced with each other more quickly. Accordingly, the humidity-adjusting effect of the humidity adjustment member 59 can be effectively exhibited when necessary. Further, since the fan 55 can be kept stopped when the fan 55 is not needed, it is possible to prevent generation of noise and consumption of power.

Therefore, in the monitoring camera 11 according to the first embodiment, it is possible to prevent the dew condensation inside the housing in the housing 13 having the sealed structure, and to reduce deterioration in image quality of a captured image.

Second Embodiment

Next, a monitoring camera 69 according to a second embodiment will be described with reference to FIGS. 9 to 12.

Figure 9:
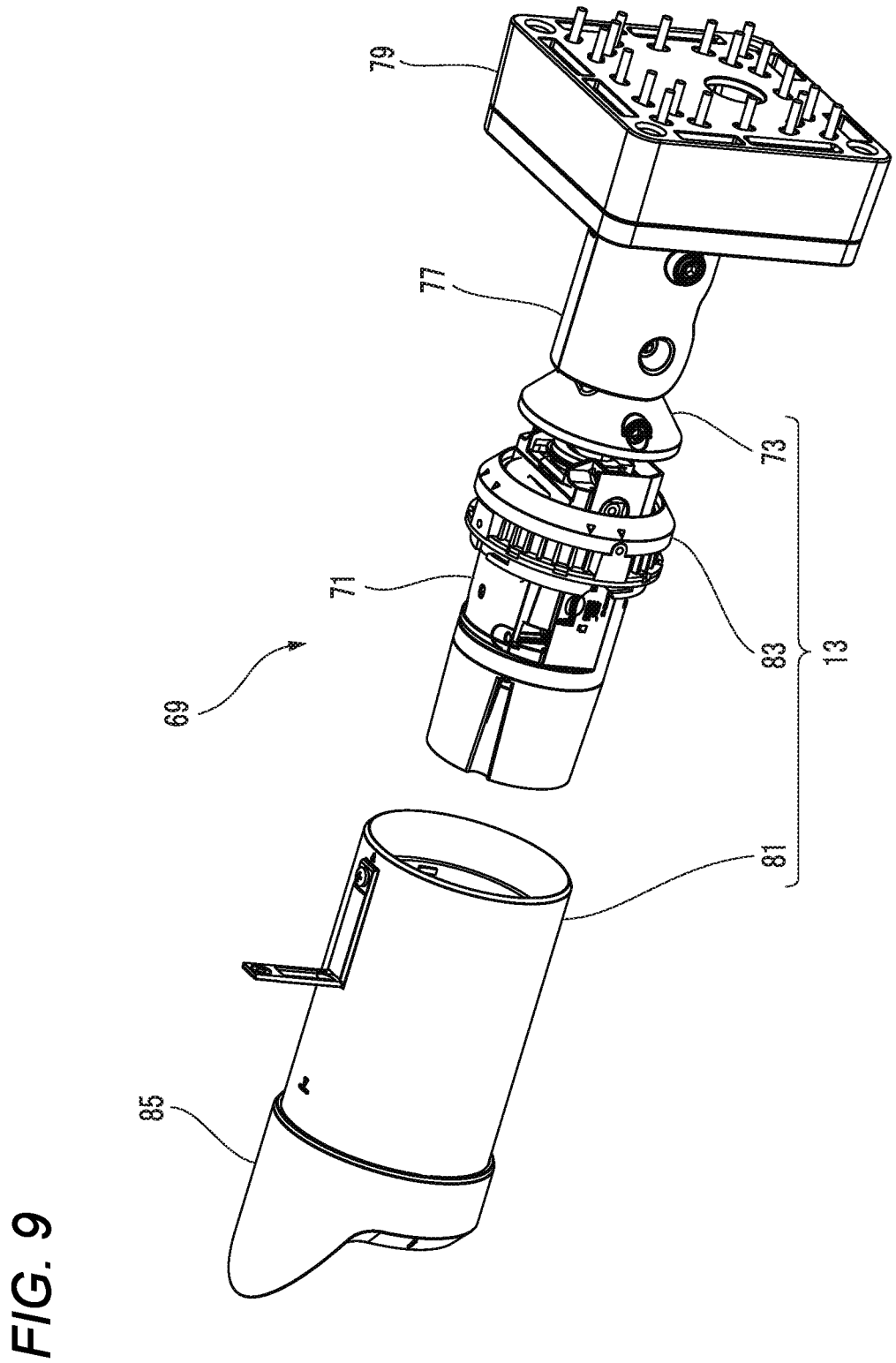
FIG. 9 is an exploded perspective view of a monitoring camera according to a second embodiment.

FIG. 9 is an exploded perspective view of the monitoring camera 69 according to the second embodiment. The monitoring camera 69 according to the second embodiment includes the housing 13 of a so-called box type (that is, a box type). An installation environment of the monitoring camera 69 is, for example, outdoors. The monitoring camera 69 may be installed indoors such as in a factory or a warehouse.

In the monitoring camera 69, a concept of a main configuration is substantially the same as that of the monitoring camera 11 according to the first embodiment except that the housing 13 is the box type and the housing 13 and a camera main body portion 71 correspond to the box type. That is, similar to the monitoring camera 11 according to the first embodiment, the monitoring camera 69 includes a heating element (for example, the substrate 27), the inner cover 33, the fan 55, the humidity adjustment member 59, and a processor (for example, the CPU 65) as an example of a control unit.

An external appearance of the camera main body portion 71 is formed in a columnar shape. A large-diameter side of a support base 73 having a truncated cone shape is fixed to a side opposite to the lens portion 29 of the camera main body portion 71. A support shaft 75 (see FIG. 11) that protrudes toward the side opposite to the lens portion 29 is fixed to a small-diameter side of the support base 73. In the camera main body portion 71, the support shaft 75 is supported by a bearing 77. The support shaft 75 is fixed to a fixing base 79 having a flat quadrangular box shape. The fixing base 79 is fixed to a fixed portion (not shown). The camera main body portion 71 is inserted into and covered by a cylindrical case 81 having a cylindrical shape. A space between the cylindrical case 81 and the support base 73 is air-tightly closed by an annular rear lid 83. The cylindrical case 81, the support base 73, and the rear lid 83 constitute the housing 13. In the cylindrical case 81, an eave 85 for blocking sunlight is attached to an upper edge on a subject side.

Figure 10:
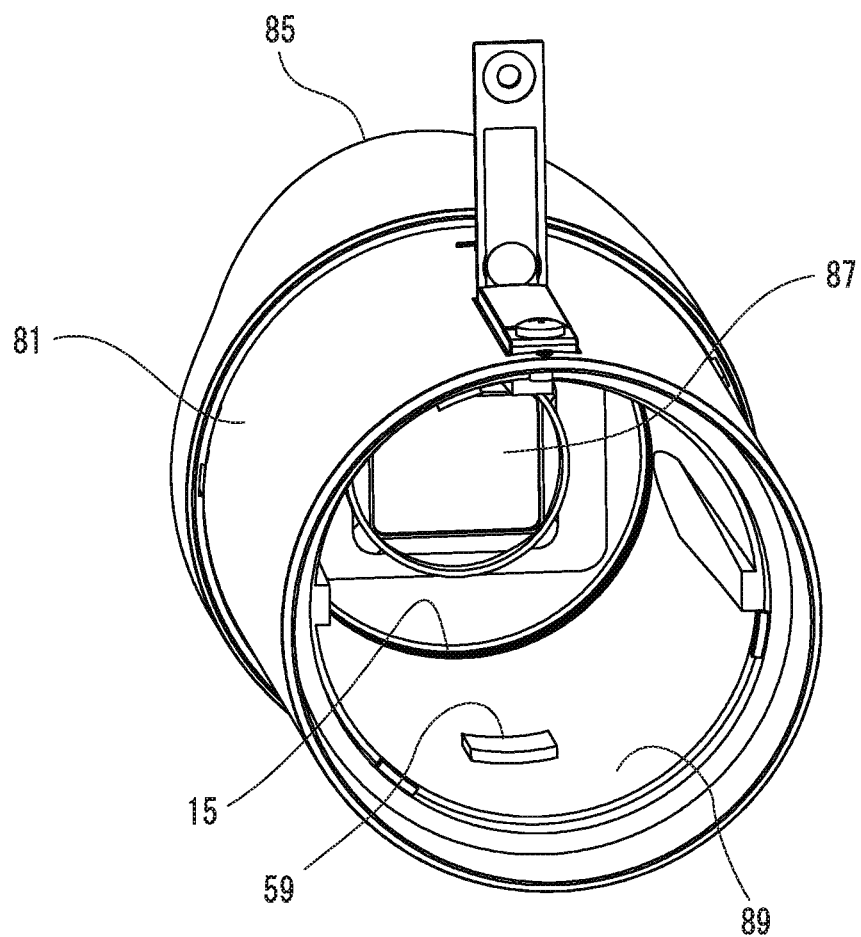
FIG. 10 is a perspective view of a cylindrical case shown in FIG. 1.

FIG. 10 is a perspective view of the cylindrical case 81 shown in FIG. 1. The opening portion 15 is formed in a front surface of the cylindrical case 81 facing the lens portion 29. The opening portion 15 is sealed by a front surface cover 87 having flat translucency. The humidity adjustment member 59 is bonded to an inner wall surface (bottom wall surface 89) of the cylindrical case 81.

Figure 11:
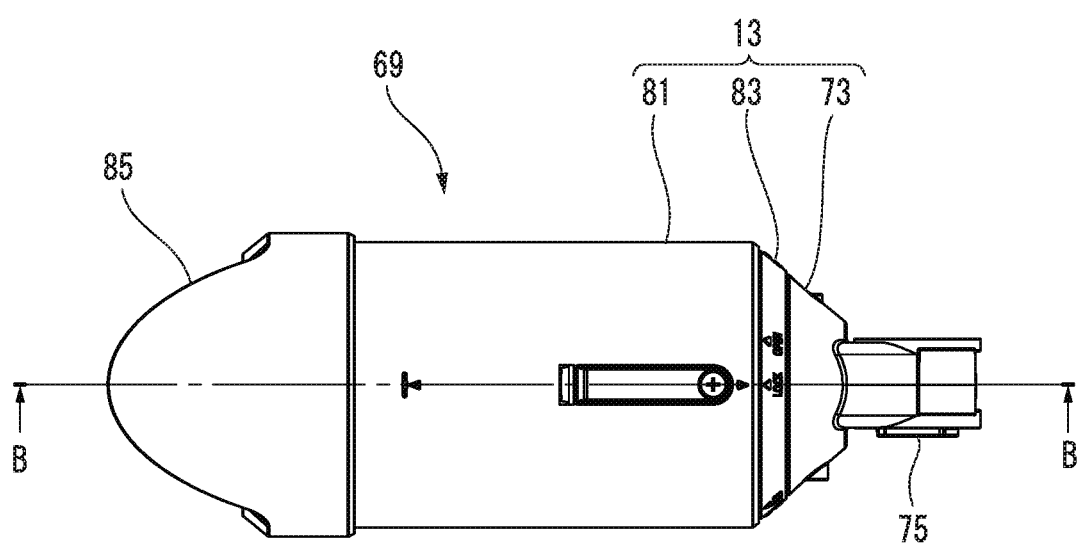
FIG. 11 is a plan view of the monitoring camera shown in FIG. 9.

FIG. 11 is a plan view of the monitoring camera 69 shown in FIG. 9. In the monitoring camera 69, the rear lid 83 and the support base 73 are sequentially assembled to a rear portion of the cylindrical case 81 to form the housing 13 having airtightness. The housing 13 is fixed to a wall surface or the like via the support base 73 that supports the support shaft 75.

Figure 12:
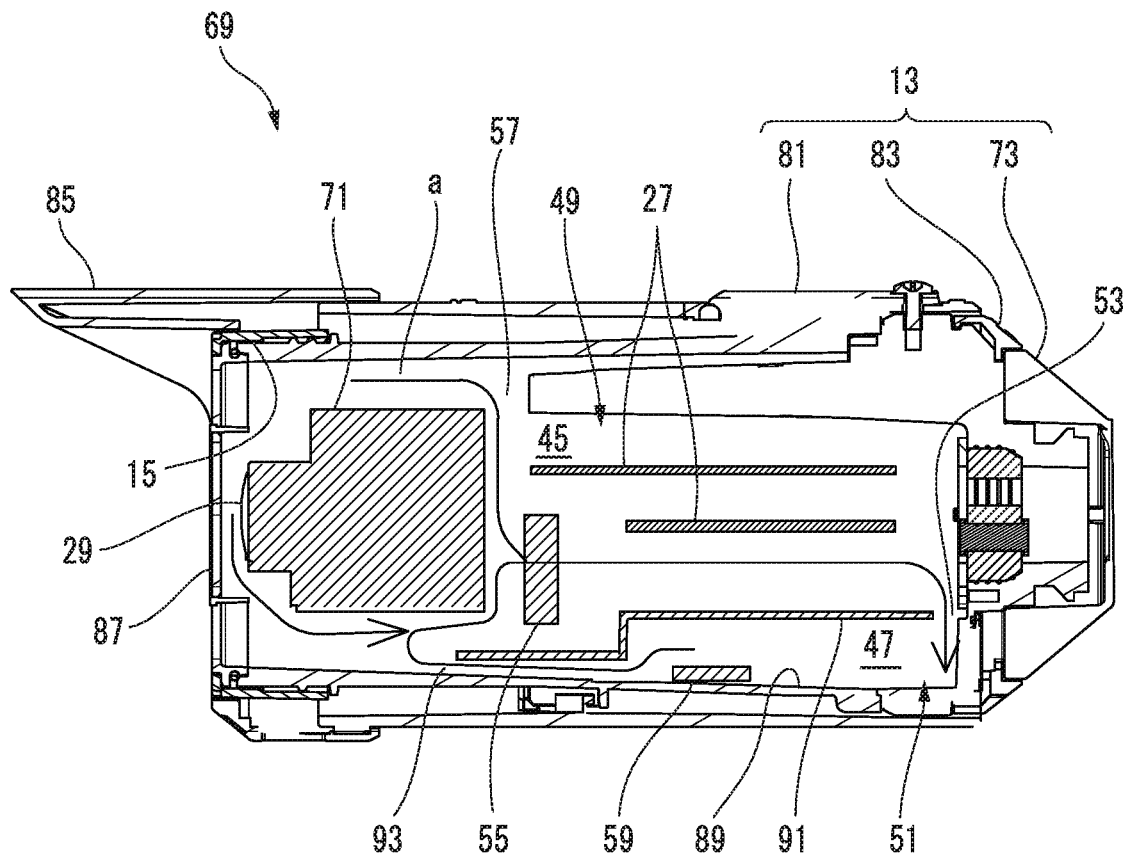
FIG. 12 is a cross-sectional view taken along a line B-B in FIG. 11.

FIG. 12 is a cross-sectional view taken along a line B-B in FIG. 11. In the monitoring camera 69, the substrate 27 that is the heating element is provided in the housing. Also in the monitoring camera 69, there are the high temperature portion 45 in which the substrate 27 is disposed, and the low temperature portion 47 that is separated from the substrate 27 and that has a temperature lower than that of the high temperature portion 45 in the housing. The humidity adjustment member 59 similar to that described above is disposed in the low temperature portion 47.

Also in the monitoring camera 69, an inner cover 91 is provided in the housing. The inner cover 91 is provided between the high temperature portion 45 and the low temperature portion 47, and partitions an inside of the housing into the high temperature chamber 49 and the low temperature chamber 51 having a temperature lower than that of the high temperature chamber 49 without airtightness. In the low temperature chamber 51, the slight gap 53 is formed at a boundary between the low temperature chamber 51 and the high temperature chamber 49. Further, a gap 93 is formed between the inner cover 91 and the cylindrical case 81. "Partitioned without airtightness" means that the slight gap 53 and the gap 93 are present.

The monitoring camera 69 includes the fan 55, which conveys air between the lens portion 29 and the front surface cover 87 to the substrate 27, in the housing. The fan 55 is installed in the high temperature chamber 49. In the high temperature chamber 49, the gap 57 that communicates between the lens portion 29 and the front surface cover 87 is formed. The fan 55 sucks air between the lens portion 29 and the front surface cover 87 from the gap 57, and supplies the air so as to blow the air to the substrate 27. The air blown to the substrate 27 to cool the substrate 27 is recirculated to a space between the lens portion 29 and the front surface cover 87 again, and a part of the air also slightly flows into the low temperature chamber 51 from the gap 53 and then recirculated to the space between the lens portion 29 and the front surface cover 87 from the gap 93 again. That is, air circulation indicated by an arrow a in FIG. 12 occurs in the housing.

The monitoring camera 69 includes the temperature sensor 61 that is similar to that described above and that is provided in the lens portion 29, and a processor that is similar to that described above (for example, the CPU 65) and that drives and controls the fan 55 when a temperature detected by the temperature sensor 61 decreases by a specified temperature within a certain period of time.

Next, an operation of the monitoring camera 69 according to the second embodiment described above will be described.

The monitoring camera 69 includes the lens portion 29, the box-shaped housing 13 in which the opening portion 15 in which the lens portion 29 is disposed is sealed by the flat front surface cover 87, the heating element provided in the housing, the high temperature portion 45 in which the heating element is disposed in the housing, the low temperature portion 47 that is separated from the heating element in the housing and that has a temperature lower than that of the high temperature portion 45, and the humidity adjustment member 59 disposed in the low temperature portion 47.

In the monitoring camera 69, the opening portion 15 of the housing 13 in which the lens portion 29 is disposed is sealed by the front surface cover 87. The substrate 27 is provided in the sealed housing. The high temperature portion 45 in which the substrate 27 is disposed and the low temperature portion 47 having a temperature lower than that of the high temperature portion 45 are present in the housing. In the monitoring camera 69, the humidity adjustment member 59 is disposed in the low temperature chamber 51.

The humidity adjustment member 59 can adjust humidity in a space to a predetermined range over a long period of time. The humidity adjustment member 59 has a humidity adjustment (humidity-adjusting) function of absorbing the moisture when the humidity is high and releasing the moisture when the humidity is low, and the effect thereof is semi-permanently continued, unlike a case where a drying ability is lost after a drying agent absorbs moisture.

The high temperature portion 45 of the housing 13 is likely to have an air temperature higher than an outside air temperature due to heat generated from the substrate 27. The humidity adjustment member 59 is disposed in the low temperature portion 47 of the housing 13, and continues to adjust relative humidity of the low temperature portion 47 to, for example, 50% to 60%.

Since a temperature of the front surface (for example, the inner surface of the front surface cover) of the lens portion 29 of the monitoring camera 69 is close to the outside air temperature, humidity-adjusted air on the inner surface of the front surface cover is cooled to about the outside air temperature.

At this time, when a water vapor amount of the humidity-adjusted air is equal to or smaller than a saturated water vapor amount of the outside air temperature, water vapor remains in the air as the water vapor and does not cause dew condensation, but when the water vapor amount of the humidity-adjusted air is equal to or larger than the saturated water vapor amount of the outside air temperature, water vapor that is not saturated may be generated as dew condensation.

Here, as an example of a use case of the monitoring camera 69, the monitoring camera 69 installed at the time of damp and hot in summer is considered.

For example, it is assumed that the monitoring camera 69 is installed in an environment in which an outside air temperature is 35° C. and humidity is 70%. When installing the camera, in order to adjust an angle of view of the lens portion 29, since the cylindrical case is once removed and the work is performed, water vapor of air at that time enters the housing of the monitoring camera 69. A water vapor amount at an outside air temperature of 35° C. and humidity of 70% corresponds to 27.7 $g/m^3$.

When the work is completed and the cylindrical case 81 is closed, the humidity adjustment member 59 adjusts humidity in the housing to, for example, about relative humidity of 50% to 60%.

At this time, the water vapor amount is about 20 $g/m^3$, and water vapor of 7 $g/m^3$ to 8 $g/m^3$ is taken into the humidity adjustment member 59. More precisely, the humidity adjustment member 59 absorbs "moisture" corresponding to water vapor of 7 $g/m^3$ to 8 $g/m^3$.

Eventually, the outside air temperature decreases toward winter, and the relative humidity in the housing is maintained at, for example, 50% to 60% while the water vapor is repeatedly absorbed or released by the humidity adjustment member 59 in accordance with a temperature at that time.

When an amount of increase in a temperature in the housing of the monitoring camera 69 is 20° C., the temperature in the housing is 25° C. in an environment of an outside air temperature of 5° C. in the winter. At this time, the humidity adjustment member 59 adjusts the humidity to a temperature in the housing of 25° C. and relative humidity of 50% to 60%. The water vapor amount at this time is about 12 $g/m^3$.

However, since the temperature of the front surface of the lens (for example, the inner surface of the front surface cover) of the monitoring camera 69 is close to the outside air temperature, for example, when the temperature is 5° C. that is the same as the outside air temperature, the saturated water vapor amount is 6.8 $g/m^3$, and therefore the water vapor of about 5 $g/m^3$ that cannot be dissolved may be condensed as water.

Therefore, regarding the effect of the humidity adjustment member 59, the smaller the amount of increase in the internal temperature of the monitoring camera 69 is, the more likely there is no temperature difference from the outside air temperature, and the higher the dew condensation prevention effect is, but the larger the amount of increase in the temperature in the housing of the monitoring camera 69 is, the larger the temperature difference from the outside air temperature is, and the lower the dew condensation prevention effect is.

In the related art, a dew condensation prevention effect is higher when the humidity adjustment member 59 is not disposed at a high temperature part (for example, the high temperature portion 45) but is disposed at a low temperature part (for example, the low temperature portion 47) even in the housing.

In this way, in the sealed housing, absolute humidity is constant even when a temperature in the housing varies. That is, in the example described above, since the housing 13 is sealed at the outside air temperature of 35° C. and the relative humidity of 70%, the water vapor amount in the housing remains at an initial sealing value of 27.7 $g/m^3$.

In a monitoring camera of the related art, relative humidity in the housing varies due to an influence of the outside air temperature. On the contrary, in the monitoring camera 69 in which the humidity adjustment member 59 is provided in the sealed housing, since the relative humidity is adjusted to 50% to 60% regardless of the change in the temperature in the housing, the absolute humidity varies.

In contrast, in the monitoring camera 69 according to the second embodiment, since the substrate 27 is disposed and the metal housing is cooled by outside air, when the low temperature portion 47 and the high temperature portion 45 are present in the housing, the relative humidity increases in the low temperature portion 47. The low temperature portion 47 may be, for example, a portion that is separated from the substrate 27 and in contact with the inner wall surface of the metal housing over a large area. Since the humidity adjustment member 59 can adjust the relative humidity to 50% to 60%, more water vapor can be absorbed by disposing the humidity adjustment member 59 in the low temperature portion 47 in which the relative humidity is high.

For example, it is assumed that a relative humidity of 90% is adjusted to the relative humidity of 50% to 60% by the humidity adjustment member 59 at a temperature of 11° C. of the low temperature portion 47. In this case, the water vapor amount at the relative humidity of 50% to 60% is about 5 g/m$^3$. Since the humidity adjustment member 59 is disposed in the low temperature portion 47, for example, when air in the housing is replaced with air in the low temperature portion 47 in which air in each portion is humidity-adjusted by natural convection, the absolute humidity of the entire housing approaches a water vapor amount of about 5 g/m$^3$. When the water vapor amount is smaller than a saturated water vapor amount of 6.8 g/m$^3$ at 5° C., even when a temperature of an inner surface of the front surface cover 87 decreases to 5° C., the dew condensation can be prevented from occurring.

The monitoring camera 69 includes the inner cover 91 that is provided between the high temperature portion 45 and the low temperature portion 47 and that partitions the inside of the housing into the high temperature chamber 49 and the low temperature chamber 51 having a temperature lower than that of the high temperature chamber 49 without the airtightness.

In the monitoring camera 69, the high temperature portion 45 and the low temperature portion 47 in the housing are partitioned by the inner cover 91. Here, the expression "partitions without airtightness" means a partition structure in which a slight amount of air can be circulated via the gap 53 slightly generated by an assembly structure such as abutting connection between members. Therefore, a large amount of air having a high temperature due to exhaust heat does not directly flow into the low temperature portion 47 from the high temperature portion 45 in which the substrate 27 is disposed. The low temperature portion 47 can prevent inflow of heat from the substrate 27, and can reliably maintain a lower temperature than the high temperature portion 45 as compared with a structure in which the inner cover 91 is not provided. Accordingly, the low temperature portion 47 for improving moisture-absorbing performance of the humidity adjustment member 59 can be more reliably secured in the narrow housing.

In the monitoring camera 69, the fan 55 that conveys air between the lens portion 29 and the front surface cover 87 to the heating element is provided in the housing.

In the monitoring camera 69, the fan 55 is provided in the housing. The fan 55 conveys the air between the lens portion 29 and the front surface cover 87 to the substrate 27. The air conveyed to the substrate 27 absorbs heat from the substrate 27 and increases a temperature thereof, and most of the air is recirculated to the space between the lens portion 29 and the front surface cover 87 again. At this time, the heated air also flows into the low temperature portion 47 from the gap between the members, but since an inflow amount is restricted to be small, the low temperature portion 47 is prevented from being heated to a high temperature due to the exhaust heat of the substrate 27. Particularly, in winter in a cold region, an amount of heat absorbed from the inner wall surface of the metal housing, which has become low in temperature due to the outside air temperature, is larger than an amount of heat due to an inflow of the exhaust heat.

In the monitoring camera 69, since air can be circulated by forced convection among the substrate 27, the lens portion 29, and the front surface cover 87, air in the low temperature portion 47 humidity-adjusted by the humidity adjustment member 59 and air in other portions can be replaced with each other more quickly than in a case of natural convection. Accordingly, a humidity-adjusting effect of the humidity adjustment member 59 can be exhibited more quickly and effectively.

The monitoring camera 69 includes the temperature sensor 61 provided in the lens portion 29, and the control unit that drives and controls the fan 55 when a temperature detected by the temperature sensor 61 decreases by a specified temperature within a certain period of time.

In the monitoring camera 69, the fan 55 is driven when a temperature of the lens portion 29 decreases and the dew condensation is likely to occur on the inner surface of the front surface cover. When the fan 55 is driven, as described above, since the air can be circulated among the substrate 27, the lens portion 29, and the front surface cover 87, the air in the low temperature portion 47 humidity-adjusted by the humidity adjustment member 59 and the air in other portions can be replaced with each other more quickly. Accordingly, the humidity-adjusting effect of the humidity adjustment member 59 can be effectively exhibited when necessary. Further, since the fan 55 can be kept stopped when the fan 55 is not needed, it is possible to prevent generation of noise and consumption of power.

Therefore, in the monitoring camera 69 according to the second embodiment, it is possible to prevent the dew condensation inside housing in the housing 13 having the sealed structure.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined freely within a range not deviating from the spirit of the invention.

INDUSTRIAL APPLICABILITY

The present disclosure is useful as a monitoring camera that can prevent dew condensation inside housing in a housing having a sealed structure and that can reduce deterioration in image quality of a captured image.

What is claimed is:
1. A monitoring camera comprising:
a lens portion;
a bottomed cylindrical-shaped housing entirely sealed by a dome cover, the lens portion disposed in the housing;
a heating element provided in the housing;
a high temperature portion in which the heating element is disposed in the housing;
a low temperature portion that is separated from the heating element and that has a temperature lower than that of the high temperature portion in the housing; and
a humidity adjustment member disposed in the low temperature portion and configured to absorb moisture when humidity in the housing is above a predetermined value, and further configured to release the absorbed moisture when the humidity in the housing is below the predetermined value.

2. The monitoring camera according to claim 1, further comprising:
an inner cover that is provided between the high temperature portion and the low temperature portion and that partitions an inside of the housing into a high temperature chamber and a low temperature chamber having a temperature lower than that of the high temperature chamber without airtightness.

3. The monitoring camera according to claim 2,
wherein an air blower configured to convey air between the lens portion and the dome cover to the heating element is provided in the housing.

4. The monitoring camera according to claim 3, further comprising:
a temperature sensor provided in the lens portion; and
a processor configured to drive and control the air blower when a temperature detected by the temperature sensor decreases by a specified temperature within a certain period of time.

5. A monitoring camera comprising:
a lens portion;
a box-shaped housing entirely sealed by a flat front surface cover, the lens portion disposed in the housing;
a heating element provided in the housing;
a high temperature portion in which the heating element is disposed in the housing;
a low temperature portion that is separated from the heating element and that has a temperature lower than that of the high temperature portion in the housing; and
a humidity adjustment member disposed in the low temperature portion and configured to absorb moisture when humidity in the housing is above a predetermined value, and further configured to release the absorbed moisture when the humidity in the housing is below the predetermined value.

6. The monitoring camera according to claim 5, further comprising:
an inner cover that is provided between the high temperature portion and the low temperature portion and that partitions an inside of the housing into a high temperature chamber and a low temperature chamber having a temperature lower than that of the high temperature chamber without airtightness.

7. The monitoring camera according to claim 6,
wherein an air blower configured to convey air between the lens portion and the front surface cover to the heating element is provided in the housing.

8. The monitoring camera according to claim 7, further comprising:
a temperature sensor provided in the lens portion; and
a processor configured to drive and control the air blower when a temperature detected by the temperature sensor decreases by a specified temperature within a certain period of time.

* * * * *